(12) United States Patent
Williams

(10) Patent No.: US 10,404,651 B2
(45) Date of Patent: *Sep. 3, 2019

(54) DOMAIN NAME SYSTEM NETWORK TRAFFIC MANAGEMENT

(71) Applicant: Red Hat, Inc., Raleigh, NC (US)

(72) Inventor: Daniel Williams, Minneapolis, MN (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/878,739

(22) Filed: Jan. 24, 2018

(65) Prior Publication Data
US 2018/0212923 A1 Jul. 26, 2018

Related U.S. Application Data

(63) Continuation of application No. 15/416,806, filed on Jan. 26, 2017, now Pat. No. 9,882,868.

(51) Int. Cl.
*H04L 12/26* (2006.01)
*H04L 29/12* (2006.01)
*H04L 12/24* (2006.01)
*H04L 29/08* (2006.01)

(52) U.S. Cl.
CPC ...... *H04L 61/2007* (2013.01); *H04L 41/0893* (2013.01); *H04L 61/1511* (2013.01); *H04L 67/02* (2013.01)

(58) Field of Classification Search
CPC .......................... H04L 43/0817; H04L 61/10
See application file for complete search history.

(56) References Cited

U.S. PATENT DOCUMENTS

| | | |
|---|---|---|
| 7,756,984 B2 | 7/2010 | Burr et al. |
| 8,549,609 B2 | 10/2013 | Horman et al. |

(Continued)

OTHER PUBLICATIONS

Taleb et al., "DNS-Based Solution for Operator Control of Selected IP Traffic Offload," NEC Laboratories Europe, http://www.soqube.com/tariktaleb/public_html1.1/Library/conf_papers/nw_conf/05963137.pdf, 5 pages, Jun. 5-9, 2011.

(Continued)

*Primary Examiner* — Arvin Eskandarnia
(74) *Attorney, Agent, or Firm* — Lowenstein Sandler LLP

(57) ABSTRACT

A mechanism for replacing a first internet protocol (IP) address with a second IP address in a response to a request to a server from an application is disclosed. A processing device may receive a request from an application. The processing device may receive a response from the server, where the response includes a first IP address. The processing device may replace the first IP address with a second IP address that is different than the first IP address. The processing device sends the response to the application and assigns a management policy to the second IP address. The management policy is different than a second management policy assigned to a third IP address associated with a second hostname assigned to the server.

20 Claims, 6 Drawing Sheets

(56) References Cited

U.S. PATENT DOCUMENTS

| | | | |
|---|---|---|---|
| 9,003,518 B2 | 4/2015 | Wyschogrod et al. | |
| 9,137,217 B1 | 9/2015 | Martini et al. | |
| 9,361,163 B2* | 6/2016 | Yuen | G06F 9/54 |
| 2003/0154306 A1* | 8/2003 | Perry | H04L 29/12009 709/245 |
| 2004/0095962 A1* | 5/2004 | Ohta | H04L 29/12066 370/475 |
| 2004/0249973 A1* | 12/2004 | Alkhatib | H04L 12/4641 709/245 |
| 2011/0103394 A1* | 5/2011 | Vogt | H04L 29/12367 370/401 |
| 2011/0138067 A1* | 6/2011 | Vashaw | G06F 9/5027 709/229 |
| 2013/0290563 A1* | 10/2013 | Fleischman | H04L 61/1511 709/245 |
| 2015/0207776 A1 | 7/2015 | Morin et al. | |
| 2015/0350044 A1* | 12/2015 | Thomassian | H04L 43/0817 370/252 |
| 2016/0191549 A1 | 6/2016 | Nguyen et al. | |
| 2016/0308821 A1 | 10/2016 | Siba et al. | |
| 2017/0033995 A1* | 2/2017 | Banka | H04L 41/0866 |

OTHER PUBLICATIONS

Windows Networking Team, "Geo-Location Based Traffic Management Using DNS Policies," https://blogs.technet.microsoft.com/networking/2015/05/11/geo-location-based-traffic-management-using-dns-policies/, 10 pages, May 11, 2015.

F5® Deployment Guide, "DNS Traffic Management using the BIG-IP Local Traffic Manager," https://www.f5.com/pdf/deployment-guides/dns-load-balancing-dg.pdf, 27 pages, Oct. 2012.

Cisco Support Community, "ASA URL filtering without a Websense or N2H2/Smartfilter server," https://supportforums.cisco.com/document/7201/asa-url-filtering-without-websense-or-n2h2smartfilter-server, 20 pages, Feb. 18, 2015.

Cisco Support Community, "Using hostnames (DNS) in access-lists—configuration steps, caveats and troubleshooting," https://supportforums.cisco.com/document/66011/using-hostnames-dns-access-lists-configuration-steps-caveats-and-troubleshooting, 14 pages, Jul. 18, 2016.

/dev/rob0, "FQDN filtering," http://lists.netfilter.org/pipermail/netfilter/2005-August/062443.html, 2 pages, Aug. 30, 2005.

* cited by examiner

DOMAIN NAME SYSTEM NETWORK TRAFFIC MANAGEMENT

CROSS-REFERENCE TO RELATED APPLICATIONS

This application is a continuation application of U.S. patent application Ser. No. 15/416,806, filed on Jan. 26, 2017, the entire contents of which are incorporated herein by reference.

TECHNICAL FIELD

Aspects of the present disclosure are generally related to computing systems, and more particularly to network traffic management.

BACKGROUND

A domain name system (DNS) enables devices and applications to find resources on a network using hostnames which are human-friendly names for servers rather than a dot-decimal notation internet protocol (IP) addresses. A DNS server responds to a hostname request with an IP address. The IP address indicates a location of a machine that hosts a service associated with the hostname.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
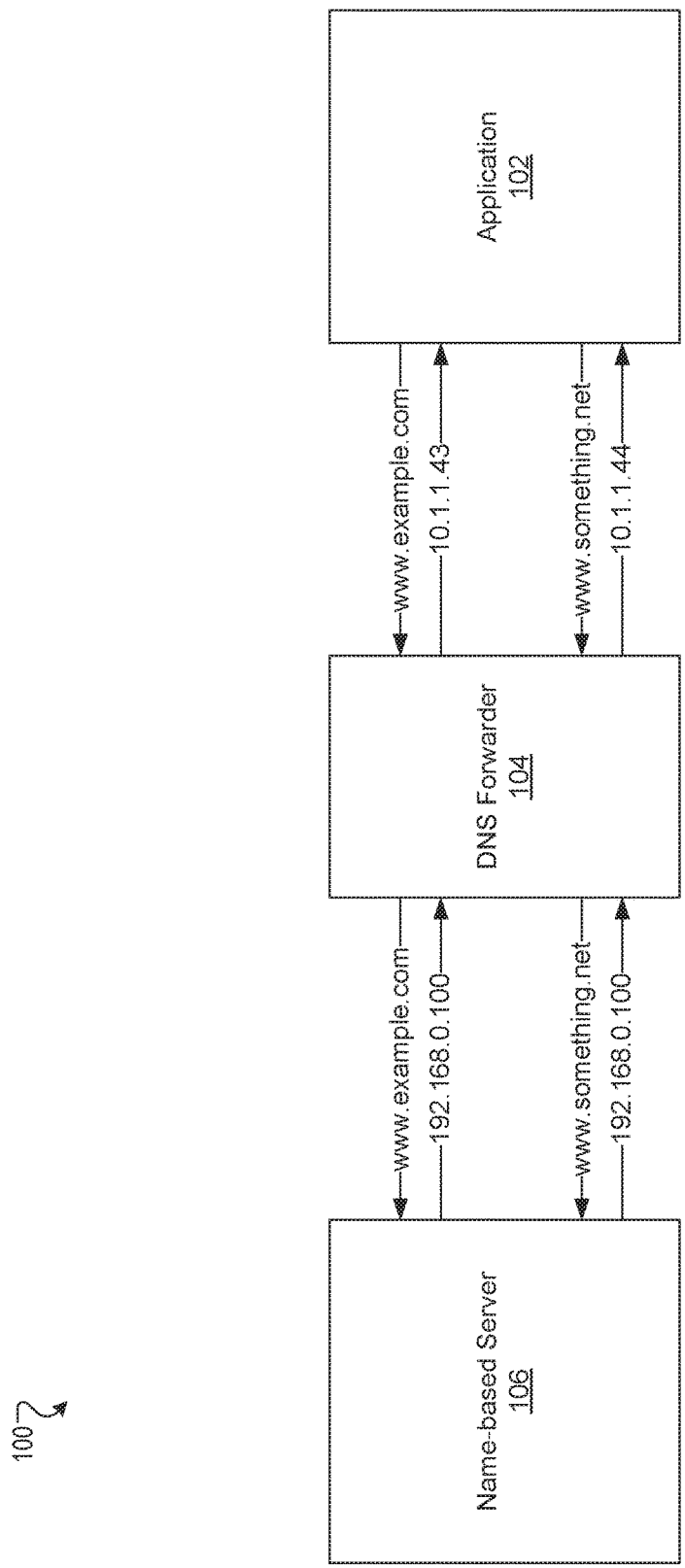
FIG. 1 illustrates a network system that includes an application, a DNS forwarder, and a name-based server according to one example.

A domain name system (DNS) is a naming system for computers, services, or other resources connected to a network that associates data or services with hostnames (also referred to as domain names). The DNS may translate hostnames into numerical Internet protocol (IP) addresses for locating and identifying computer services and devices at that IP address. A server with name-based virtual hosting may host several domains with different hostnames. A client device may report a hostname as part of a hypertext transfer protocol (HTTP) header to a server running a name-based virtual hosting program. The server may identify the hostname in the HTTP header and map the hostname to a resource or directory.

A network system may include a DNS traffic management system to manage traffic between the client device and the server. However, the DNS traffic management system may not be able to correctly manage traffic when two hostnames resolve to the same IP address. For example, the DNS traffic management system may apply a first policy to a client device accessing a first website with a first hostname and a second policy to the device accessing a second website with a second hostname. However, the DNS traffic management system may record the IP address returned from a DNS lookup by a DNS server and perform access control on the IP address. When multiple hostnames resolve to the same IP address, the DNS traffic management system may not be able to determine a policy to apply to the hostname because the DNS traffic management system uses IP addresses to determine what policies to apply.

The DNS traffic management system may include a proxy server to perform packet inspection to parse an internet protocol (IP) header, a transmission control protocol (TCP) header, or a hypertext transfer protocol (HTTP) header of a packet to find the host header and determine a hostname in a HTTP request to access data or services of the server. The DNS traffic management system may use the hostname to determine a policy to apply to the request. However, to apply management policies to HTTP request using packet inspection, the DNS traffic management system parses every packet from a client device to identify the host name. The packet inspection uses an increased amount of processing power and adds a latency to each request. Additionally, the DNS traffic management system may only be able to inspect the packets if the packets are in a format recognized by the DNS traffic management system.

Aspects of the present disclosure overcome this and other deficiencies by providing a DNS forwarder that intercepts hostname requests from client devices or applications, generates a private IP address for each requested hostname, and returns a private IP address for each requested hostname. The private IP address can be used by a DNS traffic management system to manage network traffic from the client device and apply a management policy to a request to the private IP address.

Assigning a private IP address to each hostname request may enable the DNS forwarder to differentiate between multiple hostnames that resolve to the same IP address. One advantage of differentiating between multiple hostnames that resolve to the same IP address is that the DNS forwarder may apply management policies, such as firewall policies, security policies, and quality of service (QoS) policies, on a per-hostname basis because traffic for each hostname is sent to a unique private IP address associated with that hostname without inspecting the packets.

FIG. 1 illustrates a network system 100 that includes an application 102, a DNS forwarder 104, and a name-based server 106 according to one example. The application 102 may be a program executing on a client device that sends hostname requests to the name-based server 106 via the DNS forwarder 104. For example, the application 102 may send a first hypertext transfer protocol (HTTP) request to the DNS forwarder 104 that includes a hostname, such as www.example.com. The DNS forwarder 104 may send the first HTTP request to the name-based server 106. The name-based server 106 may send a response to the DNS forwarder 104. The response may include an HTML file from a first directory, such as/var/www/user/Mary/site. The HTML file may be tags that define headings, paragraphs, lists, links, quotes, and interactive forms for a website associated with the HTTP request. The response may also include an IP address indicating a location of the server in a network where the HTML file is located, such as 192.168.0.100. The DNS forwarder 104 may generate a first private IP address, such as 10.1.1.43, to associate with the hostname of the first HTTP request. The DNS forwarder 104 may send the first private IP address to the application 102. The application 102 may use the first private IP address for subsequent accesses to services associated with the hostname, such as accessing a first website.

The application 102 may also send a second HTTP request to the DNS forwarder 104 that includes a hostname, such as www.something.net. The DNS forwarder 104 may send the second HTTP request to the name-based server 106. The name-based server 106 may send a response to the DNS forwarder 104. The response may include an HTML file from a second directory, such as /var/www/user/Joe/site/ and the same IP address as is associated with the first hostname to the DNS forwarder 104. In this example, the hostnames www.example.com and www.something.net may resolve to the same IP address of 192.168.0.100. The DNS forwarder 104 may generate a second private IP address, such as 10.1.1.44, to associate with the hostname of the second HTTP request and send the second private IP address to the application 102. The application 102 may use the second private IP address for subsequent accesses to services associated with the hostname, such as accessing a second website.

Figure 2:
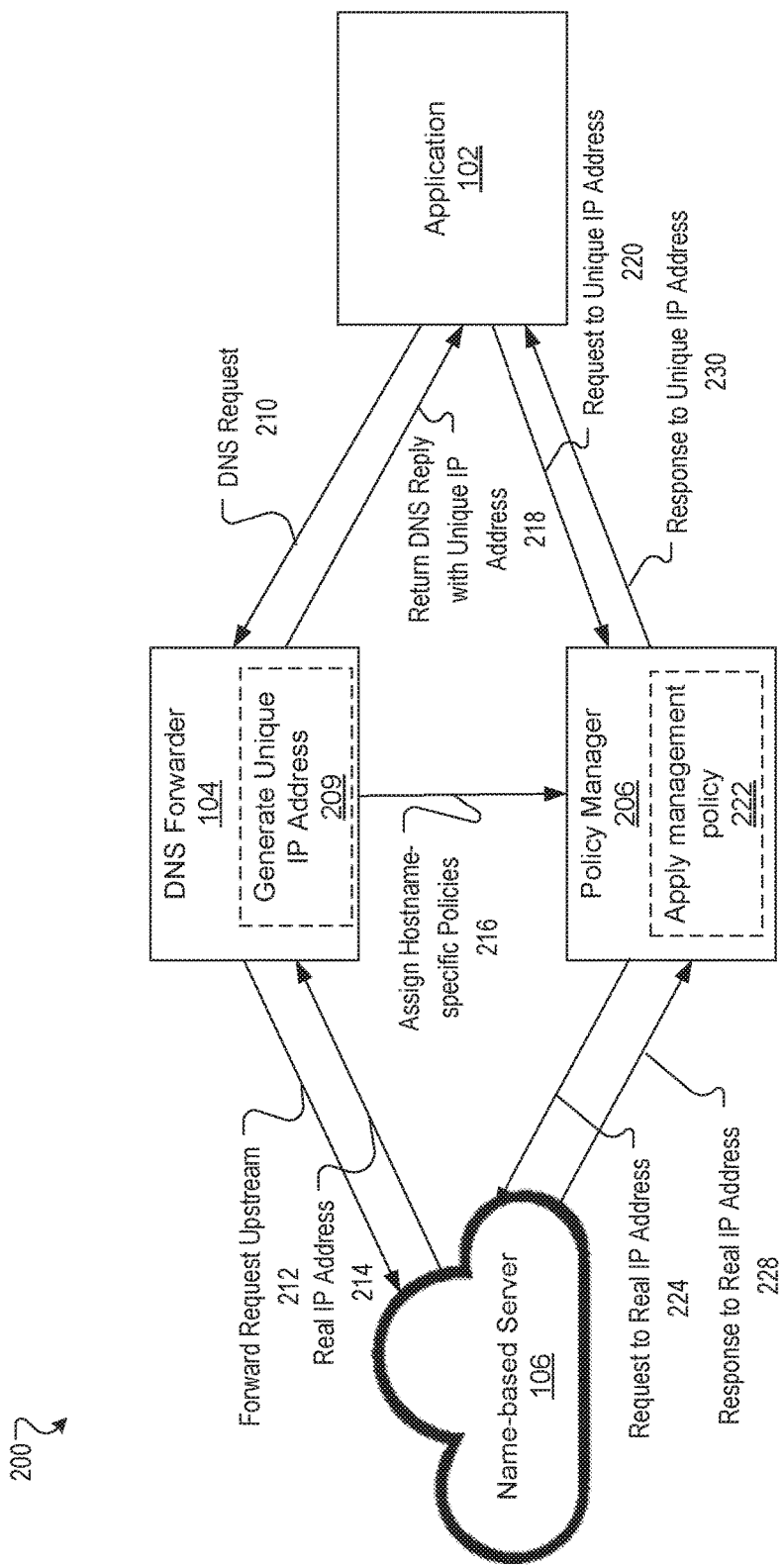
FIG. 2 illustrates a network system that includes the application, the DNS forwarder, a policy manager, and a name-based server according to one example.

FIG. 2 illustrates a network system 200 that includes the application 102, the DNS forwarder 104, a policy manager 206, and the name-based server 106 according to one example. In one implementation, the application 102 may be a program executing on a processor or a virtual machine. In another implementation, the application 102 may be a program executing on a client device, such as a processing device. The program may be a containerized application that runs on a single control host and accesses a single kernel. The containerized application may not access resources for other programs and executes in an isolated system. The policy manager 206 may apply different policies to different containerized applications accessing different server resources, such as different websites. For example, a first containerized application and a second containerized application may be executing on a processing device. As discussed below, the policy manager 206 may apply a first policy to the first containerized application and a second policy to the second containerized application. In one implementation, the name-based server 106 may be a name-based virtual HTTP host. In another implementation, the name-based server 106 may be a computer server.

The application 102 may send a DNS request 210 to the DNS forwarder 104. The DNS forwarder 104 may send the DNS request upstream 212 to the name-based server 106. The name-based server 106 may generate a response 214 to the DNS request. The response 214 may include a public IP address retrieved by the name-based server 106 from a DNS lookup table. The name-based server 106 may send the response to the DNS forwarder 104. The DNS forwarder 104 may generate a private IP address and replace the public IP address in the response with a private IP address (block 209). The private IP address may be unique to the hostname. For example, the private IP address may have a 1-to-1 mapping to the hostname. The DNS forwarder 104 may send the response to the application 102. The application 102 may direct subsequent requests to access the resources associated with the hostname to the private IP address.

The DNS forwarder 104 may send a request to the policy manager 206 to assign a policy to the private IP address. In one example, the DNS forwarder 104 may query a database at a memory to identify a policy associated with a hostname in the DNS request 210 and assign the policy to the private IP address. In one implementation, the policy may be a firewall policy indicating whether the application 102 may access the resources associated with the hostname. In another implementation, the policy may be a quality of service (QoS) policy. The QoS policy may prioritize network traffic, balance bandwidth between client devices, or manage packet dropping.

The application 102 may send to the policy manager 206, a second request 220 with the private IP address to access the resources associated with the hostname. The second request 220 may be an HTTP request. The policy manager 206 may apply the policy assigned to the private IP address to the second request. In one example, when the policy is a firewall policy, the policy manager 206 may determine whether the application 102 is authorized to access the resources. When the application 102 is not authorized to access the resources, the policy manager 206 may send a response to the application 102 denying the second request 220. In one implementation, the policy manager 206 may restrict access to the name-based server 106 to requests from the application 102 that are directed to private IP addresses returned by the name-based server 106. In another embodiment, the application 102 may be executed on a processing device, and the processing device may block all traffic from the application 102 except for traffic directed to the policy manager 206.

When the application 102 is authorized to access the resources, the policy manager 206 may determine the public IP address associated with the private IP address. The policy manager 206 may replace the private IP address in the second request 220 with the public IP address and send the request 224 with the public IP address to name-based server 106.

The name-based server 106 may execute one or more instructions associated with the request 224 to generate a response 228, such as retrieving data for a website. The response 228 may include the public IP address. The name-based server 106 may send the response 228 to the policy manager 206. The policy manager 206 may replace the public IP address in the response 228 with the private IP address and send the response 230 with the private IP address to the application 102.

The DNS forwarder 104 may receive multiple DNS requests that are directed to the name-based server 106. In one implementation, the application 102 may send multiple DNS requests to the DNS forwarder 104 to access different resources another server, such as a server hosting different websites. In another implementation, the DNS forwarder 104 may receive multiple DNS requests from multiple applications or client devices. The DNS forwarder 104 may generate unique IP addresses for each request, send the unique IP addresses to each application or client device, and assign hostname specific policies for each DNS request, as discussed above. For example, the DNS forwarder 104 may receive a first request that includes a first hostname. The DNS forwarder 104 may receive a first response with a first IP address and replace the first IP address with a second IP address, as discussed above. The DNS forwarder 104 may also receive a second request that includes a second hostname. The DNS forwarder 104 may receive a second response with a third IP address and replace the third IP address with a fourth IP address. In one implementation, the first IP address and the third IP address may be the same IP address. In another implementation, the second IP address and the fourth IP address may be the same IP address.

In one implementation, the policy manager 206 may apply different policies to different client devices or different applications. For example, each request from a client device or application may include an identifier indicating the origin of the request. The policy manager 206 may query a database to identify an entry with the identifier and private IP address and apply a policy assigned to the entry. In another implementation, the policy manager 206 may apply different policies to DNS requests for different hostnames, such as www.example.com and www.something.net.

The different policies may include IP protocols (such as a transmission control protocol or a user datagram protocol), applying different quality-of-service priority protocols, port blocking protocols, and so forth. For example, a policy may specify that requests to a unique IP address associated with www.something.net may be limited to a QoS of 1 megabit per second (Mbit/second). When the policy manager 206 receives a request directed to the unique IP address, the policy manager 206 may determine the request is directed to the unique IP address and apply the 1 Mbit/second QoS policy. Traffic directed to a unique IP address associated with www.example.com may be unaffected by the 1 Mbit/second QoS policy, even though both requests are directed to the same public IP address. While FIG. 2 illustrates the application 102, the DNS forwarder 104 and the policy manager 206 as being separate, the figure is an example of components in the network system 200 and is not intended to be limiting. For example, the application 102, the DNS forwarder 104 and the policy manager 206 may be integrated into a single computing device, such as a smartphone, tablet computing device, or a computer. In another example, the DNS forwarder 104 and the policy manager 206 may be integrated into a single computing device, such as a server.

Figure 3:
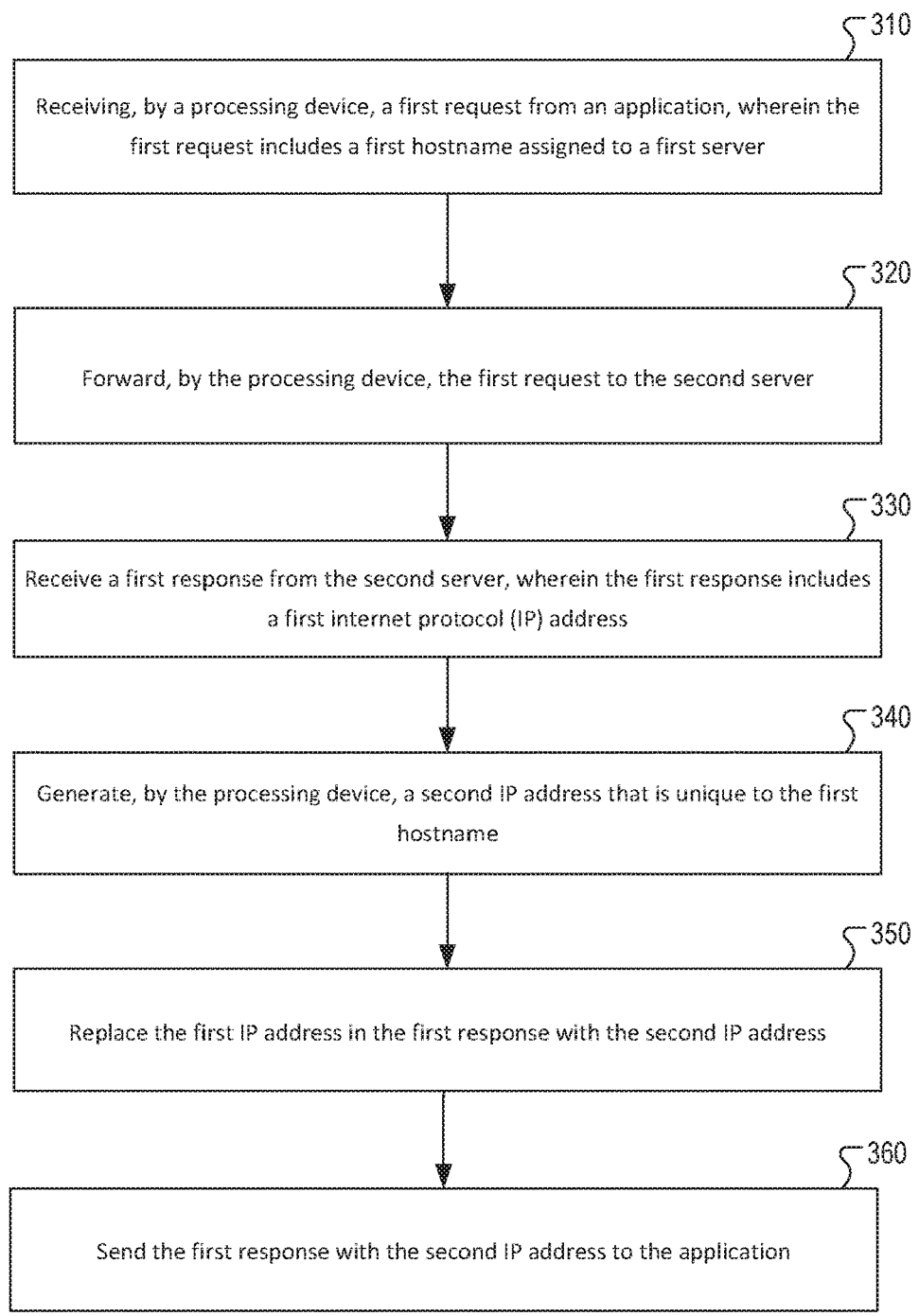
FIG. 3 depicts a flow diagram of one example of a method for assigning a unique IP address to a hostname.

FIG. 3 depicts a flow diagram of one example of a method 300 for assigning a unique IP address to a hostname. The method 300 may be performed by processing logic that may include hardware (circuitry, dedicated logic, etc.), programs (such that is run on a general-purpose computing system or a dedicated machine), or a combination of both. The method 300 may be performed in all or in part by the DNS forwarder 104 and the policy manager 206 of FIGS. 1 and 2.

At block 310, a processing device may receive a first request from an application, wherein the first request includes a first hostname assigned to a first server. At block 320, the processing device may forward the first request to second server. At block 330, the processing device may receive a first response from the second server, where the first response includes a first internet protocol (IP) address. For example, the first IP address may be a public IP address identifying a location of the first server in a network. At block 340, the processing device may generate a second IP address that is unique to the first hostname. The second IP address may be a private IP address that has a 1-to-1 mapping to the first hostname (e.g., the second IP address is not assigned to another hostname). At block 350, the processing device may replace the first IP address in the first response with the second IP address. At block 360, the processing device may send the first response with the second IP address to the application. The processing device may assign, by the processing device, a management policy to the second IP address and apply the management policy to subsequent requests directed to the second IP address.

Figure 4:
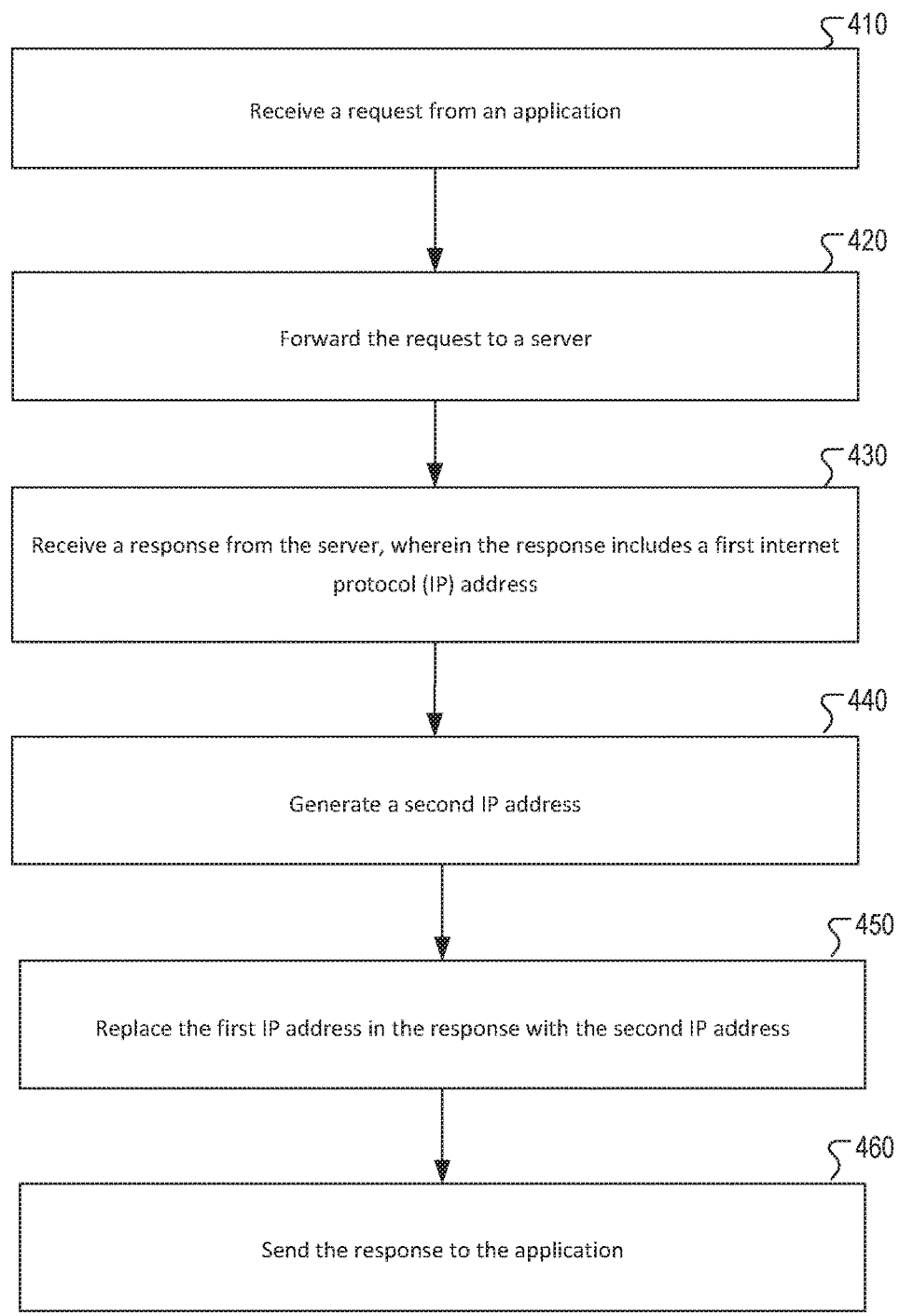
FIG. 4 depicts a flow diagram of one example of a method for replacing a first internet protocol (IP) address with a second IP address for a response from a server.

FIG. 4 depicts a flow diagram of one example of a method 400 for replacing a first IP address with a second IP address for a response from a server. The method 400 may be performed by processing logic that may include hardware (circuitry, dedicated logic, etc.), programs (such that is run on a general-purpose computing system or a dedicated machine), or a combination of both. The method 400 may be performed in all or in part by the DNS forwarder 104 and the policy manager 206 of FIGS. 1 and 2.

At block 410, a processing device may receive a request from an application. For example, the request may be to access a website hosted on a server. At block 420, the processing device may forward the request to the server. At block 430, the processing device may receive a response from the server, wherein the response includes a first internet protocol (IP) address. For example, the first IP address may be a public IP address identifying a location of the server in a network. At block 440, the processing device may generate a second IP address. For example, the second IP address may be a unique IP address that has a 1-to-1 mapping to the hostname of the first request. At block 450, the processing device may replace the first IP address in the response with the second IP address. For example, where the second IP address has a 1-to-1 mapping to the hostname, the processing device may use the second IP address to assign a policy to the unique IP address for subsequent access to the website associated with the hostname. At block 460, the processing device may send the response to the application.

Figure 5:
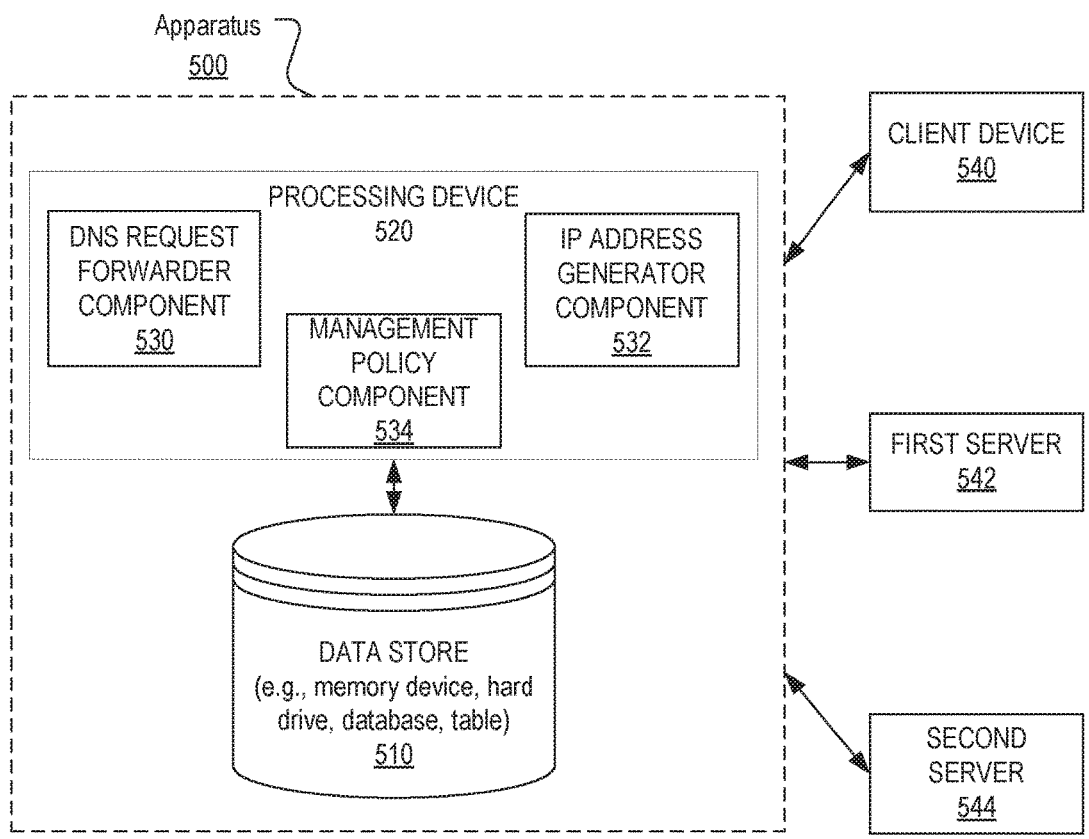
FIG. 5 illustrates an example apparatus in which implementations of the disclosure may operate.

FIG. 5 illustrates an example apparatus 500 in which implementations of the disclosure may operate. The apparatus 500 may be the same or similar to one of the distributed computing system, a network, or other computing devices. The data store 510 may include any non-persistent data storage (e.g., memory), persistent data storage (e.g., flash storage, hard drive, tape), another medium, or combination thereof that is capable of storing instructions for carrying out the operations of the components and module discussed herein. The apparatus 500 may include a data store 510 that may store information (e.g., policy management information).

The apparatus 500 may include a processing device 520. The processing device 520 may include a DNS request forwarder component 530, an IP address generator component 532, and a management policy component 534.

The DNS request forwarder component 530 may receive a first domain name service (DNS) request from a client device 540, wherein the first DNS request includes a first hostname assigned to a first server 542. The DNS request forwarder component 530 may forward the first DNS request to a second server 544. The DNS request forwarder component 530 may receive a first response from the second server 544, wherein the first response includes a first public internet protocol (IP) address. The IP address generator component 532 may generate a first private IP address. The IP address generator component 532 may replace the first public IP address with the first private IP address. The IP address generator component 532 may send the first response with the first private IP address to the client device 540. The management policy component 534 may associate a management policy with the first private IP address.

Figure 6:
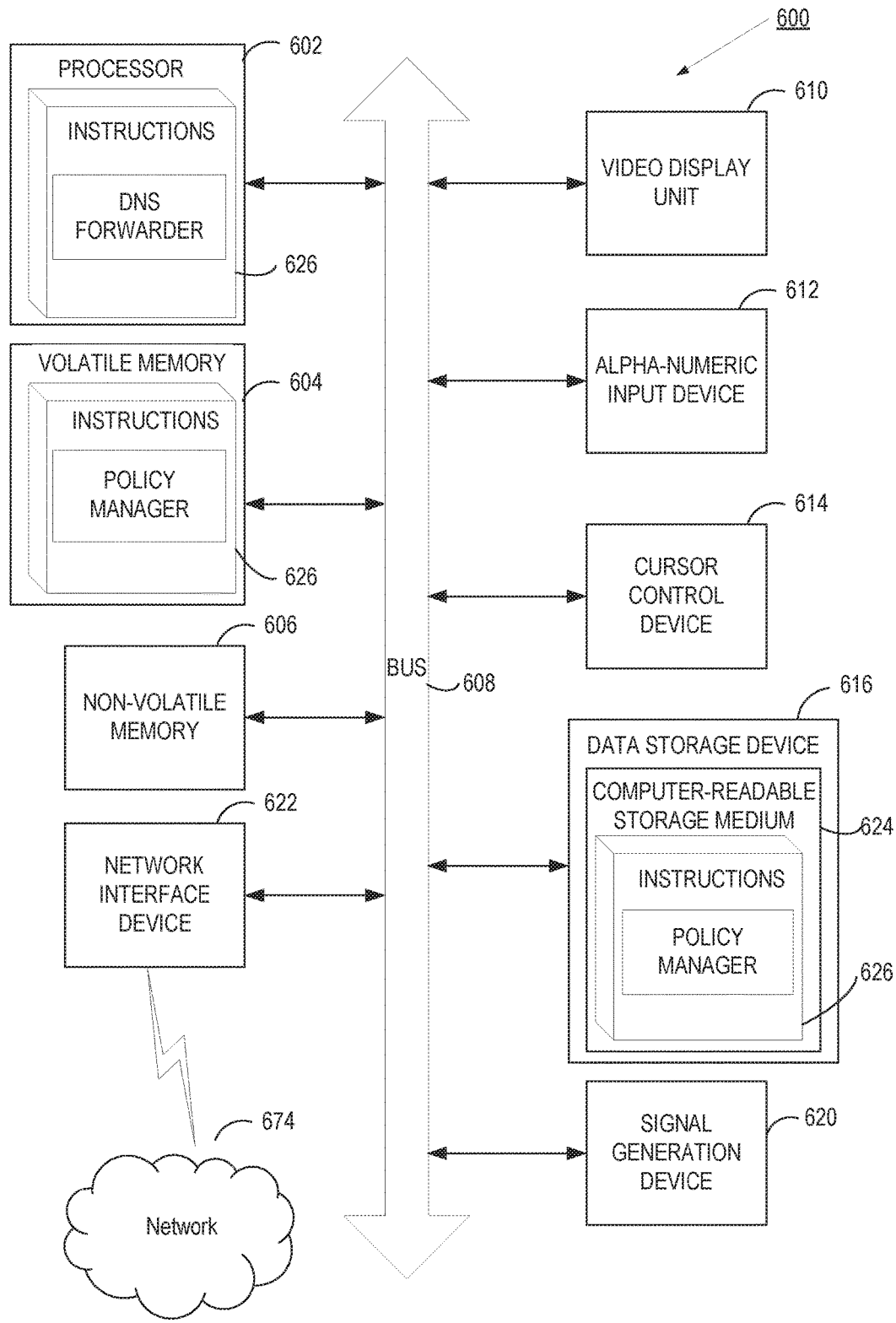
FIG. 6 depicts a block diagram of a computing system operating in accordance with one or more aspects of the present disclosure.

FIG. 6 depicts a block diagram of a computing system operating in accordance with one or more aspects of the present disclosure. In various illustrative examples, computing system 600 may correspond to one or more of the network system, the application, the DNS forwarder, the policy manager, or other computing devices.

In certain implementations, computing system 600 may be connected (e.g., via a network, such as a Local Area Network (LAN), an intranet, an extranet, or the Internet) to other computing systems. Computing system 600 may operate in the capacity of a server or a client computer in a client-server environment, or as a peer computer in a peerto-peer or distributed network environment. Computing system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computing system 600 may include a processor 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processor 602 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field-programmable gate array (FPGA), a digital signal processor (DSP), or a network processor).

Computing system 600 may further include a network interface device 622. Computing system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may be stored instructions 626 encoding any one or more of the methods or functions described herein, including instructions for implementing methods 300 and 400.

Instructions 626 may also reside, completely or partially, within volatile memory 604 and/or within processor 602 during execution thereof by computing system 600, hence, volatile memory 604 and processor 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that causes the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated into the functionality of other hardware components such as ASICS, FPGAs, DSPs or similar devices. In addition, the methods, components, and features may be implemented by program modules or functional circuitry within hardware devices. Further, the methods, components, and features may be implemented in any combination of hardware devices and program components, or only in programs.

Unless specifically stated otherwise, terms such as "loading," "transmitting," "receiving," "overwriting," "initiating," "discovering," "analyzing," or the like, refer to actions and processes performed or implemented by computing systems that manipulate and transform data represented as physical (electronic) quantities within the computing system registers and memories into other data similarly represented as physical quantities within the computing system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general-purpose computing system selectively programmed by a program stored in the computing system. Such a program may be stored in a computer-readable tangible storage medium.

The methods and illustrative examples described herein are not inherently related to any particular computer or other apparatus. Various general-purpose systems may be used in accordance with the teachings described herein, or it may prove convenient to construct more specialized apparatus to perform methods 300 and 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    receiving, by a processing device, a request from an application, wherein the request includes a first hostname assigned to a server;
    receiving a response from the server, wherein the response includes a first internet protocol (IP) address;
    replacing the first IP address in the response with a second IP address that is different than the first IP address;
    sending, by the processing device, the response to the application; and
    assigning a management policy to the second IP address, wherein the management policy is different than a second management policy assigned to a third IP address associated with a second hostname assigned to the server.

2. The method of claim 1, wherein the second IP address is a first private IP address that is unique to the first hostname, and wherein the third IP address is a second private IP address that is unique to the second hostname.

3. The method of claim 2, further comprising
    receiving a subsequent request from the application to access a resource associated with the hostname, the subsequent request being directed to the second IP address; and applying the management policy to the subsequent request.

4. The method of claim 1, wherein the request is an hypertext transport protocol (HTTP) request, wherein the receiving the response comprises receiving a hypertext markup language (HTML) file from a directory at the server, wherein the HTML file comprises the first IP address that identifies a location of the server in a network where the HTML file is located.

5. The method of claim 4, wherein the HTML file comprises tags that define at least one of a heading, a paragraph, a list, a link, a quote, or an interactive form for a website associated with the HTTP request.

6. The method of claim 1, further comprising:
receiving a second request from the application to access a resource associated with the hostname, the second request being directed to the second IP address, wherein the management policy is a firewall policy;
determining whether the application is authorized to access the resource associated with the hostname;
when the application is not authorized to access the resource, sending a second response to the application denying the second request; and
when the application is authorized to access the resource, replacing the second IP address in the second request the first IP address and sending the second request to the server.

7. The method of claim 1, wherein the management policy provides access to the server for only requests from the application that are directed to the second IP address.

8. The method of claim 1, further comprising:
receiving a subsequent request from the application that is directed to the second IP address; and
applying the management policy to the subsequent request.

9. The method of claim 1, further comprising:
receiving a second request from the application that is directed to the second IP address; and
authorizing the second request according to the management policy;
redirecting the second request to the first IP address in response to the second request being authorized;
replacing the first IP address in a second response with the second IP address; and
sending the second response to the application.

10. The method of claim 8, further comprising querying a database to identify an entry that includes the second IP address and the management policy, wherein the management policy is a security policy indicating whether the subsequent request is allowed to be sent to the server.

11. The method of claim 1, wherein the application is a containerized application.

12. The method of claim 1, further comprising:
querying a database to identify a first entry that includes the second IP address and the management policy; and
querying the database to identify a second entry that includes a third IP address and a second management policy that is different than the management policy.

13. The method of claim 1, further comprising:
receiving, by the processing device, a second request from the application, wherein the second request includes a second hostname assigned to the server, wherein the second request is a domain name service (DNS) request for the second hostname;
receiving a second response from the server, wherein the second response includes a fourth IP address;
replacing the fourth IP address with the third IP address;

sending, by the processing device, the second response to the application; and
assigning the second management policy to the third IP address.

14. An apparatus comprising:
a memory; and
a processing device, operatively coupled with the memory, to:
receive a request from an application, wherein the request includes a first hostname assigned to a server;
receive a response from the server, wherein the response includes a first internet protocol (IP) address;
replace the first IP address in the response with a second IP address that is different than the first IP address;
send the response to the application; and
assign a management policy to the second IP address, wherein the management policy is different than a second management policy assigned to a third IP address associated with a second hostname assigned to the server.

15. The apparatus of claim 14, wherein the second IP address is a first private IP address that is unique to the first hostname, and wherein the third IP address is a second private IP address that is unique to the second hostname.

16. The apparatus of claim 14, wherein the processing device is further to:
receive a subsequent request from the application to access a resource associated with the hostname, the subsequent request being directed to the second IP address; and
apply the management policy to the subsequent request.

17. The apparatus of claim 14, wherein the request is an hypertext transport protocol (HTTP) request, wherein the processing device is further to receive a hypertext markup language (HTML) file from a directory at the server, wherein the HTML file comprises the first IP address that identifies a location of the server in a network where the HTML file is located.

18. A non-transitory computer-readable storage medium, having instructions stored therein, which when executed, cause a processing device to:
receive a request from an application, wherein the request includes a first hostname assigned to a server;
receive a response from the server, wherein the response includes a first internet protocol (IP) address;
replace the first IP address in the response with a second IP address that is different than the first IP address;
send the response to the application; and
assign a management policy to the second IP address, wherein the management policy is different than a second management policy assigned to a third IP address associated with a second hostname assigned to the server.

19. The non-transitory computer-readable storage medium of claim 18, wherein the processing device is further to:
receive a subsequent request from the application to access a resource associated with the hostname, the subsequent request being directed to the second IP address; and
apply the management policy to the subsequent request.

20. The non-transitory computer-readable storage medium of claim 17, wherein the request is an hypertext transport protocol (HTTP) request, wherein the processing device is further to receive a hypertext markup language (HTML) file from a directory at the server, wherein the HTML file comprises the first IP address that identifies a location of the server in a network where the HTML file is located.

* * * * *